C. A. HULTQUIST.
ROCK DRILL.
APPLICATION FILED FEB. 19, 1912.

1,040,544.

Patented Oct. 8, 1912.

WITNESSES

INVENTOR
Charles A. Hultquist.

UNITED STATES PATENT OFFICE.

CHARLES A. HULTQUIST, OF LOS ANGELES, CALIFORNIA.

ROCK-DRILL.

1,040,544.  Specification of Letters Patent.  Patented Oct. 8, 1912.

Application filed February 19, 1912. Serial No. 678,700.

*To all whom it may concern:*

Be it known that I, CHARLES A. HULTQUIST, a citizen of the United States, residing at Los Angeles, in the county of Los Angeles and State of California, have invented new and useful Improvements in Rock-Drills, of which the following is a specification.

In a previous patent of mine, No. 978,586, December 13th, 1910, I have shown a rock drill in which the valve is supplied with the operating fluid through a swivel which has a revoluble movement with respect to the drill, which permits swinging the supply pipe to either side of the drill without detaching the pipe, and the object of the present invention is to provide an improved bearing for the swivel.

Another object is to provide a strainer in the swivel to prevent foreign substances from entering the valve with the fluid.

Figure 1:
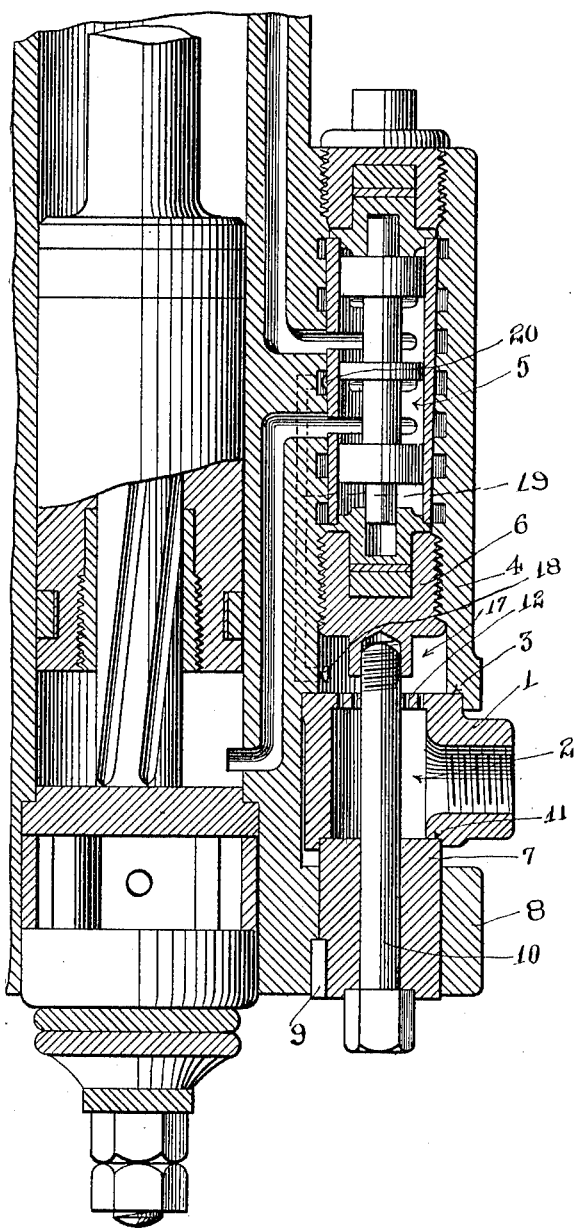
Figure 2:
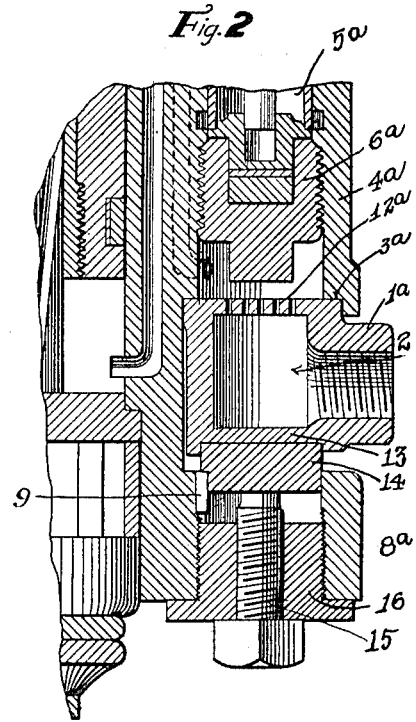

Referring to the drawings: Figure 1 is a longitudinal sectional view through a portion of the drill at the valve and swivel. Fig. 2 is a similar view showing a slightly modified form of swivel.

In the previous patent referred to, the swivel was hollow and at its inner end had a bearing directly in the main casting of the drill, while the outer end of the swivel had a bearing on a stem which projected from the valve casing, in consequence of which not only was the outer end not supported firmly enough and there was also necessarily a joint at the point where the stem passed through the end of the swivel, which was apt to leak. In the present invention I support the outer end of the swivel in a solid member directly connected with the drill casting, so that the swivel will be more firmly supported and the present construction shows elimination of the joint at the outer end which previously extended into the swivel and thereby positively avoids leakage at this point.

In the form shown in Fig. 1, 1 designates the swivel having a central chamber 2. The inner portion of the swivel has a seat at 3 and is revoluble in the casing 4 which contains the valve mechanism designated in general 5. A plug 6 screwed in the casing 4 retains the valve mechanism. The swivel 1 at its other end has a bearing on a bushing 7 which is mounted in a bracket 8 which projects from the main body portion of the drill, the bushing 7 being prevented from rotation by a key 9. A bolt 10 passes through the bushing 7 and is screwed into the end of the plug 6 and serves to hold the swivel with a close fit at its two bearing surfaces 3 and 11, preventing leakage. The bushing 7 being supported in the bracket 8 furnishes an adequate support for the outer end of the swivel so that the swivel is firmly mounted and capable of enduring severe strains when called upon to do so in use. The valve casing 4 is provided with a passage 19 establishing communication for a central port 20 from the valve to the space 17 above the member 1, passage 19 opening into said space 17 at 18, for admitting air to said space. The inner end of the swivel is provided with a perforated wall 12 which prevents foreign substances from entering the valve.

In Fig. 2 the swivel 1ª has a bearing 3ª as in the previous form, at its inner end, but at its outer end has a solid wall 13 which is recessed to form a seat for a block 14 which is mounted in the bracket 8ª. The block 14 is held against the swivel and the swivel kept with a proper working fit by a screw 15 which extends through a bushing 16 screwed into the bracket 8ª. In this form the wall 13 positively prevents leakage at the outer end of the swivel as the bolt 10 is dispensed with and also the joint 11 so that the only point of possible leakage is at the seat 3ª.

In both forms it will be noted that the swivel has an inner bearing in the main casting of the drill and that the outer end of the swivel has a bearing on a member directly supported by the main casting of the drill at that point so that in both cases this advantageous feature is present.

What I claim is:

1. In a rock drill, valve mechanism therefor, means for introducing air to said valve mechanism comprising a swivel, a bracket on the drill, means supported by the bracket for revolubly supporting one end of the swivel, and means on the drill for revolubly supporting the other end of the swivel.

2. In a rock drill, valve mechanism therefor, means for introducing air to said valve mechanism comprising a swivel, a bracket on the drill, means supported by the bracket for revolubly supporting one end of the swivel, and means on the drill for revolubly supporting the other end of the swivel, the swivel having a perforated wall through which the fluid passes to the valve mechanism.

3. In a rock drill, valve mechanism, a swivel for admitting air to the valve mechanism, means on the rock drill revolubly supporting one end of the swivel, a bracket on the drill, a bushing screwed in the bracket, a screw extending through the bushing, a block in the bracket against which the screw bears, said block revolubly supporting the other end of the swivel.

4. In a rock drill, valve mechanism, a swivel for admitting air to the valve mechanism, means on the rock drill revolubly supporting one end of the swivel, a bracket on the drill, a bushing screwed in the bracket, a screw extending through the bushing, a non-revoluble block in the bracket against which the screw bears, said block revolubly supporting the other end of the swivel.

In testimony whereof, I have hereunto set my hand at Los Angeles, California, this 12th day of February, 1912.

CHARLES A. HULTQUIST.

In presence of—
ARTHUR P. KNIGHT,
GLADYS RUSSELL.

Copies of this patent may be obtained for five cents each, by addressing the "Commissioner of Patents, Washington, D. C."